United States Patent
Ostwald

[15] 3,656,633
[45] Apr. 18, 1972

[54] SHOCK ABSORBER

[72] Inventor: Fritz Ostwald, Buchschlag, Germany

[73] Assignee: International Telephone and Telegraph Corporation, New York, N.Y.

[22] Filed: Apr. 20, 1970

[21] Appl. No.: 30,055

[30] Foreign Application Priority Data

Apr. 29, 1969 Germany..................P 19 21 897.4

[52] U.S. Cl................................213/43, 188/275, 213/8, 267/65
[51] Int. Cl..................................B61g 9/16, B61g 11/12
[58] Field of Search..................213/8, 43, 223; 267/64, 65; 188/275

[56] References Cited

UNITED STATES PATENTS

| | | | |
|---|---|---|---|
| 3,483,952 | 12/1969 | Cardwell | 213/43 |
| 2,512,269 | 6/1950 | Ezbelent | 188/275 |
| 3,127,958 | 4/1964 | Szostak | 188/275 |
| 3,414,092 | 12/1968 | Speckhart | 188/275 |
| 3,456,764 | 7/1969 | Myers | 213/43 |
| 3,190,458 | 6/1965 | Zanow | 213/43 |
| 3,412,870 | 11/1968 | Rollins | 213/43 |

*Primary Examiner*—Drayton E. Hoffman
*Attorney*—C. Cornell Remsen, Jr., Walter J. Baum and Paul W. Hemminger

[57] ABSTRACT

A hydraulic shock absorber for railroad cars having a first cylindrical member having a closed end and an opened end; a second cylindrical movable member disposed adjacent the opened end of the first member, surrounding the first member, longitudinally movable with respect to the first member and connected to a movable load; a third tubular member disposed within and coaxial of the first member and secured to the second member and a fourth tubular member secured to the closed end of the first member and disposed within and coaxial of the first member extending into and in a slidable non-sealed association with the third member. First and second piston discs are disposed transverse of the first member in a predetermined manner to form a first hydraulic medium chamber between the first and second discs, the interior of the first member and the exterior of the third member and a second hydraulic medium chamber between the second disc, the closed end of the first member, the interior of the first member and the exterior of the fourth member. The non-sealed association of the third and fourth members provide a hydraulic medium communication between the second chamber and the interior of both the third and fourth members. An arrangement is disposed in the second disc for hydraulic communication between the first and second chambers. At least one passageway is provided extending transversely from the interior of the fourth member to the second chamber. A control sleeve carrying thereon an inert mass slidably engages the fourth member adjacent the closed end of the first member and the one passageway and is responsive to deceleration of the load. This latter arrangement closes the one passageway when the deceleration is less than the given amount and opens the one passageway when the deceleration is greater than the given amount to reduce the damping of the shock absorber.

11 Claims, 2 Drawing Figures

Inventor
Fritz Ostwald

SHOCK ABSORBER

BACKGROUND OF THE INVENTION

1. Field of the Invention

The invention relates to hydraulic shock absorbers and particularly hydraulic shock absorbers for railroad cars in which the coupling carrier and the load carrier are movable relatively to each other in longitudinal direction of the car when a shock acts upon the coupling, the hydraulic shock absorber being arranged between these two parts and converting a part of the shock energy into heat in order to prevent the cargo from being damaged.

2. Description of Prior Art

Since the known shock absorbers on the ends of railroad cars have not been able to absorb the energies caused by harder shocks, such as during automatic assembling of a train, and therefore cannot guarantee efficient protection of the goods, long-stroke shock absorbers have been suggested in which the control damping depends on the piston displacement.

Since the kinetic energy of the shock which has to be absorbed is a function of not only the abutting speed but also the mass or the weight of the cargo, which is different in each case, a shock absorber with practically constant damping is not able to offer sufficient protection of the cargo against shocks under all conditions. When such a shock absorber is designed for the average cargo weights, the damping and the absorption of energy may not be sufficient when the cargo weight is increased so that it does not correspond to the design of the shock absorber. On the other hand, the stroke and damping will be more than necessary for slight shocks.

In order to eliminate this disadvantage, German Pat. No. 1,259,370 discloses a long-stroke shock absorber which provides means for adjusting the damping in response to cargo weight. For this purpose the axle pressure is used as a measure of the cargo weight. The data obtained from the axle pressure signal has to be transmitted to the long-stroke shock absorber which provides means for adjusting the damping by turning two tubes, lying closely one in the other, against each other in such a way that pairs of passage holes in a throttle arranged in the cylinder of the shock absorber can be matched to each other, in this way varying the cross section of the free passage of the holes and thus the damping of the shock absorber in dependence on the cargo weight.

SUMMARY OF THE INVENTION

This construction is a rather intricate solution of the problem and therefore it is an object of the present invention to provide a simpler, automatic control device for the damping forces which requires minimum servicing.

According to the invention this is achieved by providing means for the determination of the instantaneous deceleration of the car and for the control of a passage shutter for the pressure medium in dependence on the deceleration. These means for the automatic control of the damping forces are arranged in the interior of the cylinder of the shock absorber.

In a tube, extending into a slidable hollow piston rod and being attached to the fixed bottom of the outer cylinder, bores are provided whose area varies in response to the position of a control sleeve which is arranged to slide on the tube and carries an inert mass, this inert mass being connected with the bottom of the outer cylinder by a spring.

The interior of the outer cylinder which communicates with elastic bellows receiving the displaced hydraulic liquid is subdivided by a piston disc having a throttle passage for limiting the flow across the piston when the shock absorber is loaded and its length being reduced and a spring-loaded valve for balancing pressure when the load on the shock absorber is removed.

At the end of a cylindrical extension of the outer wall of the cylinder rubber buffers are arranged.

The basic idea of the invention is to control the damping directly in dependence on the deceleration and not in dependence on the piston displacement. Since deceleration is a function of speed and weight, it is a good parameter to use in controlling damping. When the deceleration exceeds a predetermined maximum value, the inertia force of the mass carried by the control sleeve overcomes its spring and begins to open the choke bores between the tube and the cylinder thereby reducing the damping by providing an additional damping flow path.

DESCRIPTION OF THE SPECIFIC EMBODIMENT

Figure 1:
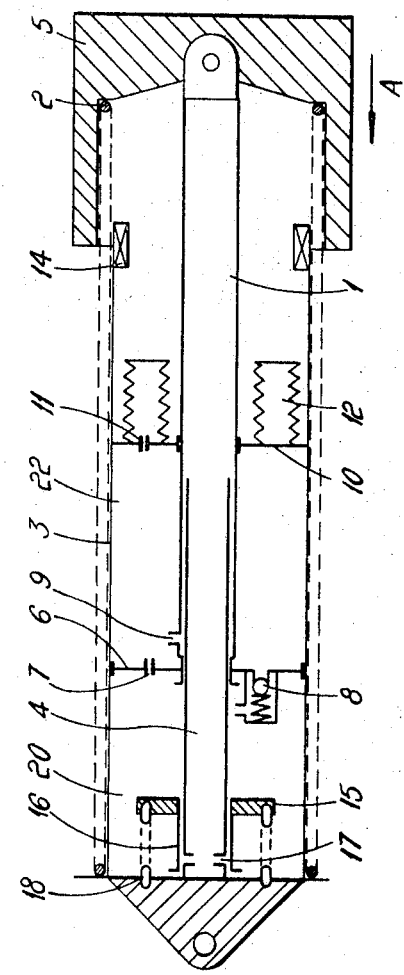
FIG. 1 is a schematic illustration of a shock absorber in accordance with the principles of the present invention.
Figure 2:
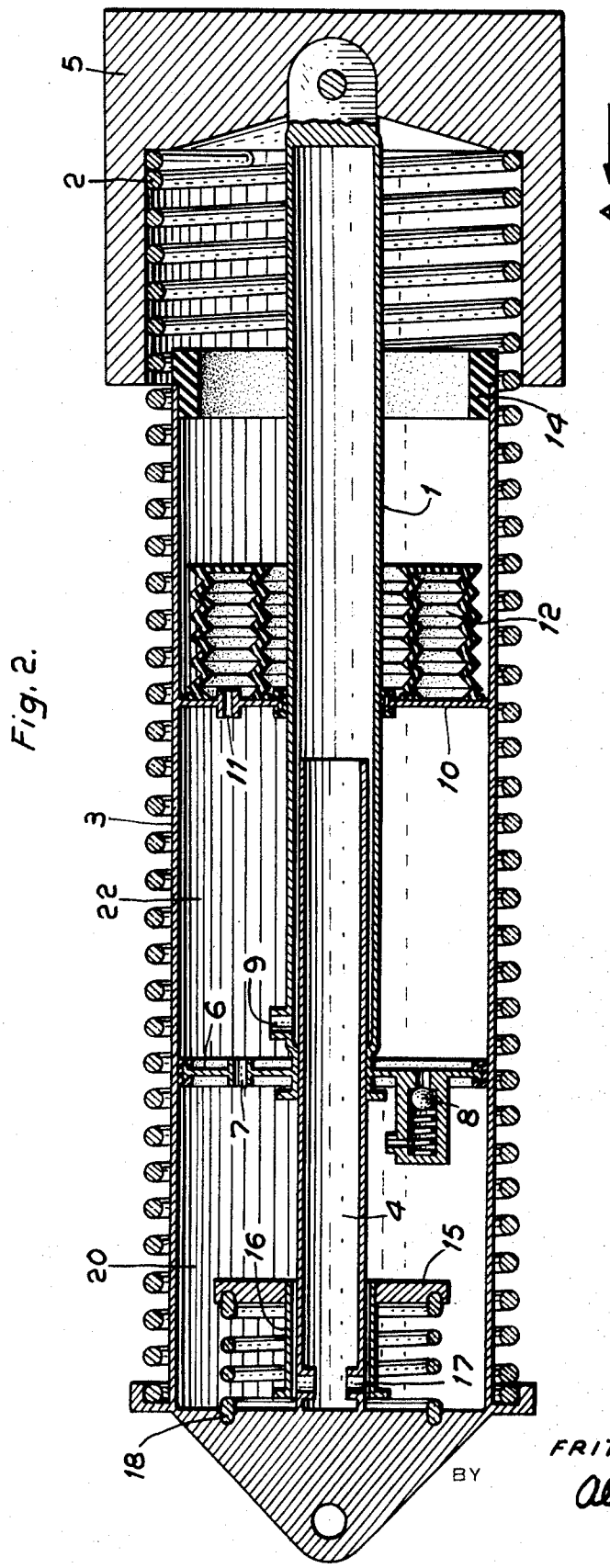
FIG. 2 is a longitudinal cross sectional view of the shock absorber of FIG. 1.

The shock absorber shown in FIGS. 1 and 2 in its relaxed condition has an outer cylinder 3 (first cylindrical member), one end of which is connected to an object, the movement of which is to be damped, while the other end is slidable within a buffer 5 (second cylindrical member). A helical spring 2 holds the shock absorber in the extended position shown.

A tube 4 (fourth tubular member) attached to the base of the outer cylinder 3 plunges into the hollow piston rod 1 (third tubular member). The tube 4, the piston rod 1 and the outer cylinder 3 are arranged concentrically to each other. A piston disc 6 which is fixed to the piston rod 1 slides on the tube 4. The piston disc 6 divides the interior of the outer cylinder 3 into two variable volume chambers 20 and 22 whose combined volume is constant. A choke bore 7 restricts the flow of hydraulic liquid from chamber 20 to chamber 22 while a spring-loaded ball valve allows free flow in the opposite direction.

A bore 9 connects the inside of the piston rod 1 to the chamber 22. A second piston disc 10 is attached to the cylinder 3 and fits closely against the piston rod 1 so that the piston disc is movable with respect to the piston rod. Another choke bore 11 connects the chamber 22 of the cylinder with elastic bellows 12 which receives the volume of hydraulic fluid displaced from the inside of the piston rod when the length of the damper is reduced by the relative movement of the buffer 5 in the direction shown by the arrow A in the drawing. In order to reduce the load on the piston rod during shocks, an annular rubber buffer 14 is arranged on the end of an extension of the outer cylinder 3, the extension having a conic shape for better guiding of the helical spring 2. The distance between the rubber buffer 14 and the bottom of the buffer 5 determines the maximum piston stroke. At the bottom of the outer cylinder 3 which is firmly connected with the railroad car, a valve is provided between the chamber enclosed by the tube 4 and the piston rod 1, and the interior of the outer cylinder 3. This valve reacts to axial deceleration due to the arrangement of an inert mass 15 on a control sleeve 16 which can slide on the tube 4 and in rest position closes the bores 17 in the tube 4. The inert mass 15, e.g., a ring disc fixed to the sleeve 16, is connected to the cylinder bottom by a return spring 18. The control edges of the bores in the tube 4 are insensitive to viscosity.

As already mentioned, the inert mass 15 connected with the control sleeve 16 is preferably a disc in order to achieve a hydraulic shock absorption of the sleeve.

The shock absorber operates as follows:

When a car is braked in direction A via the buffer 5 without excessive deceleration, the piston rod 1 with the piston disc 6 is moved against the force of the spring 2 and the hydraulic fluid is displaced through the bores 7 and 9 and into the elastic bellows 12 via bore 11. The extent of the damping is predetermined by the flow characteristics of the choke bores.

As the shock absorber is brought back into the initial position by the helical spring 2, the valve 8 opens and causes a pressure balance in the interior of the outer cylinder 3. In the described case the relatively small deceleration of the car has very little or no influence on the valve sleeve 16 which operates dependently on the deceleration.

If the deceleration of the car exceeds the permissible maximum, the inert mass 15 moves in opposite direction of A and by displacing the control sleeve 16 opens a hydraulic bypass through the passages 17 for the hydraulic liquid from the tube 4 and piston rod 1 to the interior of the outer cylinder 3 so that the flow resistance for the hydraulic liquid is reduced thereby reducing the rate of deceleration.

Upon reduced deceleration the spring 18 returns the control sleeve 16 to its initial position. The maximum of the deceleration can be predetermined by the stiffness of the spring.

The abutting of the piston disc 6 on the control sleeve 16 results in a hydraulic damping caused by abutting in the end position. To reduce the friction between the control sleeve 16 and the tube 4, the sleeve can be guided by ball bearings.

I claim as my invention:

1. A hydraulic shock absorber comprising:
   a first cylindrical member having a closed end and an opened end;
   a second cylindrical movable member disposed adjacent said opened end, surrounding said first member, longitudinally movable with respect to said first member and connected to a movable load;
   a third tubular member disposed within and coaxial of said first member and secured to said second member;
   a fourth tubular member secured to said closed end and disposed within and coaxial of said first member extending into and in a slidably, non-sealed association with said third member;
   a first piston disc disposed transversely of said first member secured at a given point to the inner surface of said first member and in a slidably, sealed relation with respect to said third member;
   a second piston disc disposed transversely of said first member between said first piston disc and said closed end in a slidably, sealed relation with respect to the inner surface of said first member and secured adjacent the end of said third member to form a first hydraulic medium chamber between said first and second piston discs, the interior of said first member and the exterior of said third member and a second hydraulic medium chamber between said second piston disc and said closed end, the interior of said first member and the exterior of said fourth member, the non-sealed association of said third and fourth members providing a hydraulic medium communication between said second chamber and the interior of both said third and fourth members;
   first means disposed in at least said second piston disc for hydraulic medium communication between said first and second chambers;
   at least one passageway disposed adjacent said closed end extending transversely from the interior of said fourth member to said second chamber; and
   second means slidably engaging said fourth member adjacent said closed end and said one passageway responsive to deceleration of said load, said second means closing said one passageway when said deceleration is less than a given amount and opening said one passageway when said deceleration is greater than said given amount to reduce the damping of said shock absorber.

2. A shock absorber according to claim 1, wherein said first means includes
   at least one first choke bore disposed in said second piston disc for hydraulic medium communication from said second chamber to said first chamber, and
   at least one spring loaded ball valve disposed in said second piston disc for hydraulic medium communication from said first chamber to said second chamber.

3. A shock absorber according to claim 2, wherein said first means further includes
   at least one second choke bore extending transversely from the interior of said third member into said first chamber.

4. A shock absorber according to claim 1, further including
   a helical spring disposed coaxially of the outer surface of said first member and in working relation with said closed end and said second member.

5. A shock absorber according to claim 1, further including
   a rubber buffer secured to the end of said first member adjacent said second member to limit the longitudinal movement of said second member toward said closed end.

6. A shock absorber according to claim 1, further including
   an elastic bellows secured to said first piston disc and disposed between said first piston disc and said second member, and
   at least one choke bore disposed in said first piston disc for hydraulic medium communication between said first chamber and said bellows.

7. A shock absorber according to claim 1, wherein said second means includes
   a sleeve slidably engaging said fourth member adjacent said closed end and said one passageway,
   an inert mass secured to the end of said sleeve remote from said closed end, and
   a spring connecting said inert mass to said closed end to normally position said sleeve to close said one passageway, said deceleration greater than said given amount causing said inert mass to overcome the force of said spring to open said one passageway.

8. A shock absorber according to claim 7, wherein said inert mass includes
   a ring disc disposed in a transverse relation with respect to said fourth member to also provide a hydraulic shock absorbing action for said sleeve.

9. A shock absorber according to claim 1, wherein, said first means includes
   at least one first choke bore disposed in said second piston disc for hydraulic medium communication from said second chamber to said first chamber,
   at least one spring loaded ball valve disposed in said second piston disc for hydraulic medium communication from said first chamber to said second chamber, and
   at least one second choke bore extending transversely from the interior of said third member into said first chamber for hydraulic medium communication between said first and second chambers; and
said second means includes
   a sleeve slidably engaging said fourth member adjacent said closed end and said one passageway,
   an inert mass secured to the end of said sleeve remote from said closed end, and
   a spring connecting said inert mass to said closed end to normally position said sleeve to close said one passageway, said deceleration greater than said given amount causing said inert mass to overcome the force of said spring to open said one passageway.

10. A shock absorber according to claim 9, wherein said inert mass includes
    a ring disc disposed in a transverse relation with respect to said fourth means to also provide a hydraulic shock absorbing action for said sleeve.

11. A shock absorber according to claim 10, further including
    a helical spring disposed coaxially of the outer surface of said first member and in a working relation with said closed end and said second member;
    a rubber buffer secured to the end of said first member adjacent said second member to limit the longitudinal movement of said second member toward said closed end;

an elastic bellows secured to said first piston disc and disposed between said first piston disc and said second member; and at least one third choke bore disposed in said first piston disc for hydraulic medium communication between said first chamber and said bellows.

* * * * *